United States Patent [19]

Bowen et al.

[11] 4,236,631
[45] Dec. 2, 1980

[54] CONVEYOR UNIT

[75] Inventors: David Bowen, Birmingham; David Boot, West Midlands, both of England

[73] Assignee: The Lucas Electrical Company, Ltd., Birmingham, England

[21] Appl. No.: 733,775

[22] Filed: Oct. 19, 1976

Related U.S. Application Data

[63] Continuation of Ser. No. 576,657, May 12, 1975, abandoned.

[30] Foreign Application Priority Data

May 18, 1974 [GB] United Kingdom ............... 22274/74

[51] Int. Cl.$^3$ ............................................. B65G 41/00
[52] U.S. Cl. .................................... 198/583; 198/301; 198/862
[58] Field of Search ............... 198/300, 301, 302, 339, 198/340, 341, 580, 583, 584, 606, 804, 860, 862

[56] References Cited

U.S. PATENT DOCUMENTS

| | | | |
|---|---|---|---|
| 1,603,634 | 10/1926 | Nelson | 198/583 |
| 2,420,009 | 5/1947 | Osgood | 198/314 |
| 2,467,136 | 4/1949 | Jones | 198/583 |
| 2,536,961 | 1/1951 | Smith | 198/606 |
| 2,886,164 | 5/1959 | Solecki | 198/358 |
| 2,951,577 | 9/1960 | Wilcoxen | 198/584 |
| 2,974,360 | 3/1961 | Giles | 198/606 |
| 3,116,824 | 1/1964 | Stram | 198/817 |
| 3,187,878 | 6/1965 | Harrison et al. | 198/461 |

FOREIGN PATENT DOCUMENTS

| | | | |
|---|---|---|---|
| 1180134 | 6/1959 | France | 198/584 |
| 495642 | 11/1938 | United Kingdom | 198/318 |

Primary Examiner—Robert B. Reeves
Assistant Examiner—Douglas D. Watts
Attorney, Agent, or Firm—Holman & Stern

[57] ABSTRACT

A conveyor unit comprises a conveyor carried by a movable support, which support also carries a conveyor drive. The conveyor drive is provided with a control including a light source and a detector cell for sensing the presence of an article on a predetermined region of the conveyor, and the conveyor drive is started and stopped in accordance with signals from the detector cell. A location bar which extends around the conveyor is used for connecting the conveyor unit with another such unit at either end or at the side thereof. The support also carries a services conduit which has an outlet enabling electrical power supply to be provided for the conveyor drive. The services conduit can be connected at each end with the services conduit of an adjoining conveyor unit.

13 Claims, 4 Drawing Figures

CONVEYOR UNIT

This is a continuation of application Ser. No. 576,657, filed May 12, 1975, now abandoned.

FIELD OF THE INVENTION

This invention relates to a conveyor unit and is particularly, though not exclusively, concerned with a conveyor unit for use in an assembly line of the type described in our co-pending British Pat. Application No. 22263/74 entitled "ASSEMBLY LINE SYSTEM".

SUMMARY AND OBJECTS OF THE INVENTION

According to the present invention, there is provided a conveyor unit comprising a conveyor, a movable support for said conveyor, a conveyor drive carried by said support, a control for said conveyor drive, said control including means for sensing the presence of an article on a predetermined region of the conveyor and being arranged so that the conveyor drive is started and stopped in dependence upon signals from said sensing means, at least one service connection carried by said support, and means for connecting the conveyor unit with another such unit at either end thereof.

Preferably, the sensing means is arranged to be adjustable relative to the conveyor to enable the predetermined region of the conveyor to be selected according to the requirements of use of the conveyor unit.

The movable support may include a housing in which the conveyor drive is located.

Conveniently, the conveyor drive is an electric motor and most conveniently is incorporated into a motorised drum.

Preferably, said at least one service connection is provided in the form of at least one outlet from a service conduit which is adapted to be connected at each end with similar service conduits of adjoining conveyor units. Typically it is intended that the service conduit should carry electrical power and compressed air supplies and control and communication system wiring.

The support may include means to enable a work surface to be secured thereto.

Preferably, the support is adapted to permit at least one work surface to be secured thereto at each side of the conveyor, and/or at each end thereof.

Conveniently, the support is provided with a locker.

An embodiment of the present invention will now be described, by way of example, with reference to the accompanying drawing, in which:

DESCRIPTION OF PREFERRED EMBODIMENTS

Figure 1:
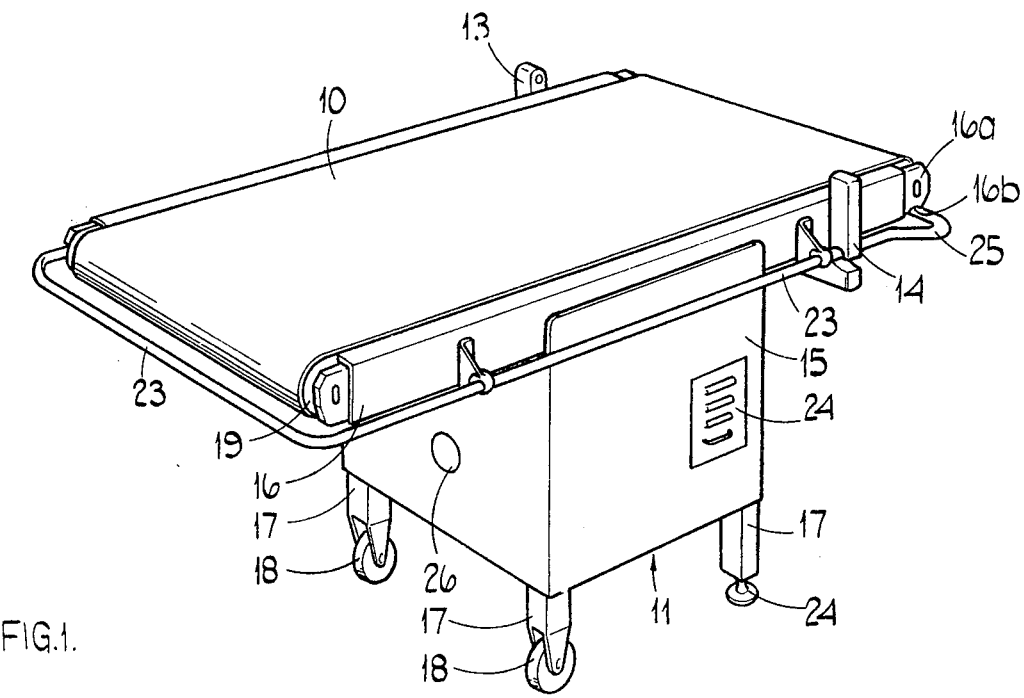
FIG. 1 is a schematic perspective view of a conveyor unit according to the present invention.

Referring to the drawing, the conveyor unit is intended for us in an assembly line system of the type described in our co-pending British Patent Application No. 22263/74 entitled "ASSEMBLY LINE SYSTEM".

Figure 2:
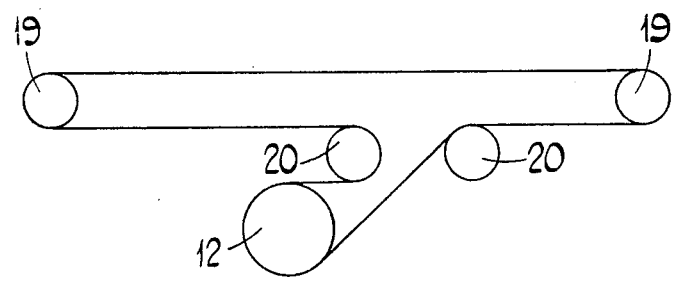
FIG. 2 is a schematic illustration of a conveyor and drive therefor, forming part of the conveyor unit of FIG. 1, and FIGS. 3 and 4 are schematic illustrations of two ways in which two conveyor units according to the present invention may be connected together.

The conveyor unit comprises an endless belt conveyor 10, a support 11 for the conveyor, and an electric motor incorporated into a motorised drum 12 (see FIG. 2) driving the conveyor belt 10.

The conveyor unit further comprises a control including a light source 13 and a light emitting diode type receiving cell 14 for sensing the presence of an article on a predetermined region of the conveyor belt 10. The said control is of a type well known per se and is arranged to start and stop the motor of the motorised drum 12 in dependence upon signals from the cell 14 so that when an article on the conveyor belt 10 interrupts a light beam passing from source 13 to cell 14, the motorised drum 12 stops and, when the article is removed, the motorised drum 12 starts again. The light source 13 and cell 14 are adjustable longitudinally of the conveyor belt 10 to enable the motorised drum 12 to stop the belt 10 when an article reaches any desired predetermined region on the conveyor.

The support 11 includes a housing 15 carrying a frame 16 and supported on four legs 17, two of which are provided with castors 18, the other two of which have adjustable-height feet 24. The frame 16 carries at each end thereof a freely rotatable roller 19 around which the conveyor belt 10 passes. The conveyor belt 10 also passes around a further pair of rollers 20 mounted in the housing 15 and around the motorised drum 12.

A location bar 23 is mounted on the frame 16 and extends completely there around. The location bar 23 has a downwardly cranked end portion 25 adjacent one of the rollers 19. The source 13 and cell 14 are mounted on the location bar 23 on either side of frame 16, and are each movable along the location bar 23. Alternatively, the source 13 and cell 14 can be located on the support 11. Work surfaces (not shown) can be secured to the location bar 23 at either side or at either end of the conveyor unit.

Figure 3:
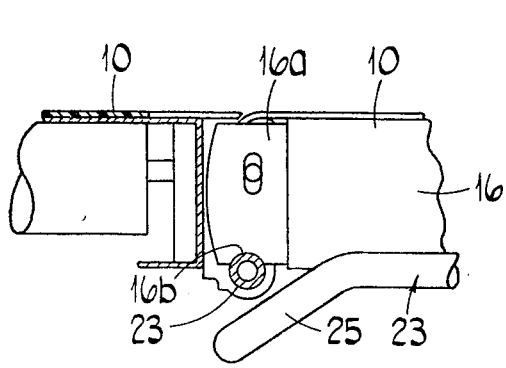
Figure 4:
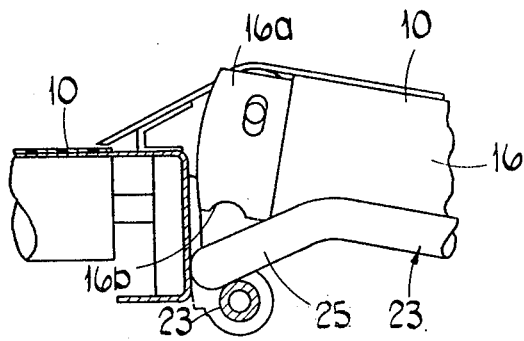

The location bar 23 also enables the conveyor unit to be connected with other similar units at the sides or ends thereof. FIGS. 3 and 4 show two ways in which the conveyor unit may be so connected. The frame 16 has a portion 16a at the end thereof adjacent the cranked end portion 25 of the location bar 23, and this portion 16a is provided with a notch 16b in the lower edge thereof. In FIG. 3, the notch 16b on the conveyor unit engages the location bar 23 of an adjacent conveyor unit, and the cranked portion 25 of the location bar 23 of the former unit is disposed beneath the location bar 23 of the latter unit, so that the upper surfaces of the conveyor belts 10 and the two units are level. In FIG. 4, the cranked portion 25 of the location bar 23 of the conveyor unit locates above the location bar 23 of the adjacent conveyor unit, so that the upper surface of the conveyor belt 10 of the former unit lies above that of the conveyor belt 10 of the latter unit. In this case, the whole of the former unit is tilted by adjustment of the height of the feet 24. The connection between the two units is described more fully in our co-pending British Application No. 22263/74.

The location bar 23 also provides a hand grip for use when the conveyor unit is moved into and out of position in the assembly line system.

Also carried by the support 11 is a services conduit 26 which is arranged at each end to be connected with the services conduit of an adjacent conveyor unit. The services conduit 26 has an outlet which enables an electrical supply to be connected to the motor of the motorised drum 12 via the control, and also enables service connections such as electrical power and compressed air to be made with work stations (not shown). The services conduit 26 may also carry control and communication system wiring.

The housing 15 may also be provided with a personal locker 24 therein.

The conveyor unit described above is typically 4 ft 6 ins long (not including the location bar 23) and 1 ft 9 ins wide (again not including the location bar 23); the conveyor belt 10 is 1 ft 6 ins wide; the frame 16 has a depth of 3½ ins; and the upper surface of the conveyor belt 10 is 2 ft 5 ins above floor level when the feet 24 are adjusted so that frame 16 is horizontal. The speed of the belt 10 is typically 34 ft per minute.

As indicated above, the conveyor unit described above can be connected with a series of similar conveyor units to form a conveyor arrangement for an assembly line system of the type described in the above mentioned co-pending British Patent Application. Reference is drawn to this application with regard to the mode of operation and advantages thereof compared with conventional assembly line systems.

It will be manifest that a conveyor unit according to the present invention is self contained and is easily movable so that it can be used in the formation of a wide variety of assembly line systems.

We claim:

1. A conveyor unit comprising a conveyor, a mobile support carrying said conveyor, a conveyor drive carried by said mobile support, a control for said conveyor drive, said control including means for sensing the presence of an article on a predetermined region of said conveyor, so that said conveyor drive is started and stopped in dependence upon signals from said sensing means, at least one service connection carried by said mobile support, and connection means carried by said mobile support at the ends and at the sides of said conveyor unit for quick connection and disconnection of another such conveyor unit selectively at either end and at either side therof, said connection means including a location bar surrounding said conveyor, said location bar having a downwardly-cranked end portion adjacent one end of the conveyor unit, wherein said mobile support includes a notched portion adjacent said downwardly-cranked end portion of said location bar, means defining a notch in said notched portion being arranged to engage a location bar on an adjoining, similar conveyor unit.

2. The conveyor unit according to claim 1, wherein said sensing means is mounted on said location bar.

3. The conveyor unit according to claim 1, wherein said mobile support connection means comprises means to enable a work surface to be secured thereto.

4. The conveyor unit according to claim 1, wherein said location bar includes portion which permits a work surface to be secured to said support.

5. The conveyor unit according to claim 1, wherein said sensing means is adjustable longitudinally relative to said conveyor to enable said predetermined region of said conveyor to be selected according to the requirements of said conveyor unit.

6. The conveyor unit according to claim 1, wherein said sensing means comprises a light source and a light-sensitive cell disposed on opposite sides of said conveyor.

7. The conveyor unit according to claim 1, wherein said mobile support includes a housing in which said conveyor drive is located.

8. The conveyor unit according to claim 7, wherein said conveyor drive includes an electric motor.

9. The conveyor unit according to claim 8, wherein said electric motor is incorporated into a motorized drum.

10. The conveyor unit according to claim 1, wherein said at least one service connection is provided as at least one outlet from a service conduit which is arranged to be connected at each end with similar service conduits of adjoining, similar conveyor units.

11. The conveyor unit according to claim 10, wherein said service conduit carries at least one service selected from the group consisting of an electrical power supply, compressed air supply, control system wiring and communication system wiring.

12. The conveyor unit according to claim 1, wherein said support is provided with a locker.

13. A conveyor unit comprising a conveyor, a mobile support carrying said conveyor, a conveyor drive carried by said mobile support, a control for said conveyor drive, said control including means for sensing the presence of an article on a predetermined region of said conveyor, so that said conveyor drive is started and stopped in dependence upon signals from said sensing means, at least one service connection carried by said mobile support, and connection means carried by said mobile support at the ends and at the sides of said conveyor unit for quick connection and disconnection of another such conveyor unit selectively at either end and at either side thereof, said connection means including a location bar, wherein said mobile support includes a notched portion at one end thereof, means defining a notch in said notched portion being arranged to engage a location bar on an adjoining, similar conveyor unit.

* * * * *